W. G. COLLINS.
Metal-Shears.
No. 208,888. Patented Oct. 15, 1878.
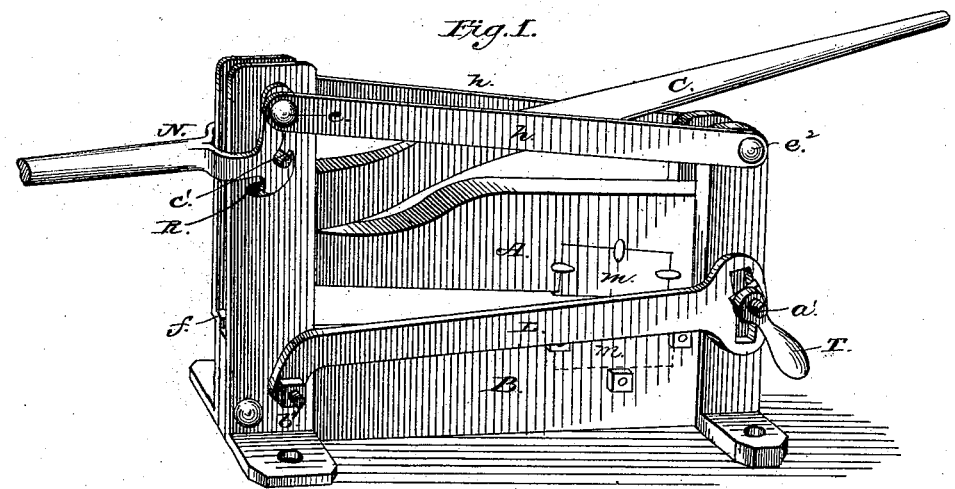
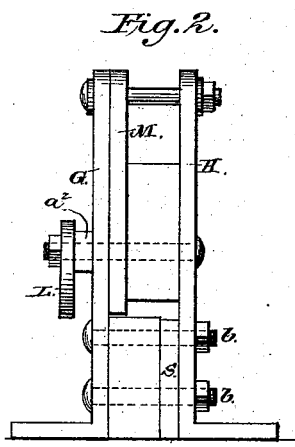
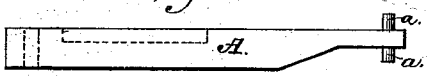
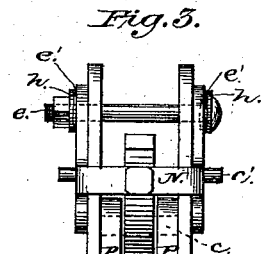
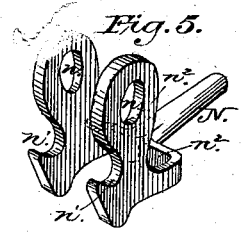
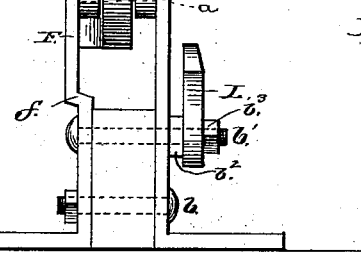
Attest:
B. B. Collins
S. E. Brown
Inventor.
William G. Collins

UNITED STATES PATENT OFFICE.

WILLIAM G. COLLINS, OF CLEVELAND, OHIO, ASSIGNOR TO THE CLEVELAND HARDWARE COMPANY, OF SAME PLACE.

IMPROVEMENT IN METAL SHEARS.

Specification forming part of Letters Patent No. 208,888, dated October 15, 1878; application filed December 13, 1877.

*To all whom it may concern:*

Be it known that I, WILLIAM G. COLLINS, of Cleveland, in the county of Cuyahoga and State of Ohio, have invented certain new and useful Improvements in Metal Shears; and I do hereby declare the following is a full, clear, and exact description thereof, which will enable others skilled in the art to which it appertains to make and use the same, reference being had to the accompanying drawings, making part of this specification, in which—

Figure 1 is a perspective view of my shear complete. Fig. 2 is a front elevation of the front portion. Fig. 3 is a rear elevation of the rear portion. Fig. 4 is a top view of the upper blade. Fig. 5 is a perspective view of the catch. Fig. 6 is a detail front view of my shear in a modified form, and Fig. 7 is a detached view of one of the rear standards.

A and B are, respectively, the upper and lower blades of my shear. Each is recessed near the front end—one on one side and one on the other—to receive the knives $m$ $m$, of hardened steel, the said knives being held in position by bolts through the blades in the usual manner.

After much pains, observation, and expense I have discovered that the maximum of stiffness and strength with minimum expense of material and manufacture is arrived at in my arrangement—namely, the recess for the knives in the blades is about half the thickness of the blades or about double the thickness of the knives. I am thus enabled to use a deep and comparatively thin piece of wrought-iron for the blade, and the labor upon the blades is extremely little in order to finish them for the shear. This arrangement necessitates setting the upper blade so that its recessed side is about perpendicularly over the center of the lower blade.

In order to save labor upon the standards G H and to secure a better result, I make use of two washers, M and S, Fig. 2, with which I line up the two blades to relatively correct positions; but the said standards may be bent much in the form shown in Fig. 6, and so dispense with the washers.

E and F are two upright standards at what I choose to call the "rear end" of the machine, as it is farthest from the operator, and G H are the front standards. All these standards have their bases bent outward, to form feet for bolting the shear in permanent position. The blade B is rigidly secured between these said standards at their bases by the bolts $b$ $b$ $b$ $b^1$ running through. The upper blade, A, is also inclosed between these standards, but loosely, having for its pivot or fulcrum the bolt $a^1$, running through it and the front standards, the bolt $a^1$ being tightened up by the nut $a^2$.

C is the lever, to which the power to work the shear is applied, and has for its pivot or fulcrum the pin $c'$, which said pin extends each way from the lever C through two corresponding L-shaped slots, R, Figs. 1 and 7, in the standards E and F. There may be two or more steps in the said slots. I prefer to cut away for a short distance about one-half of the thickness off the rear end of the blade A from the side toward the standard F, leaving that end about the thickness of the lever C, as shown in Fig. 3. Then I set out the standard F at the point $f$, Figs. 1 and 3, the thickness of the strap P.

P P are two straps, one on each side of the lever C and blade A, by means of which the power is conveyed from the lever to the blade, the said straps being pivoted to the lever and blade by the pins $c$ and $a$, respectively, passing through them, as shown. The back end of blade A, the straps, and the base of the lever, all in proper position, as above described, are just so snugly inclosed between the rear standards, E and F, as to permit the necessary vertical movements of the lever, blade, and straps without any sidewise play. The lever C is bent in the form shown in Fig. 1, so as to be thrown up out of the way when not in use, passing slightly beyond the center of gravity and leaning against the bolt $e$.

L in Figs. 1, 2, and 3 is a guard, to keep the metal to be cut at, or nearly at, right angles with the knives. This guard is pivoted at its rear end upon the bolt $b^1$ and between the nuts $b^2$ and $b^3$, Fig. 3. In its front end is a vertical slot, through which passes the bolt $a^1$. The nut $a^2$, Fig. 2, is screwed up tight, Then outside of it, on the bolt, is the guard, and outside of all is a nut, T, which I prefer should have a handle formed upon it, as shown in Fig. 1; or a common nut and wrench may be used. The guard is made thick at the lower end of the slot, and tapers to the upper edge to about one-half the thickness below, so that when the nut I is set firm the guard is prevented from being forced upward, not only on account of being clamped between the nuts, but because of this wedge shape.

$h\ h$, Figs. 1, 2, and 3, are two braces, rigidly fastened to the standards by the bolts $e$ and $e^2$, and are for the purpose of assisting in keeping the standards in proper position.

N, Figs. 1, 3, and 5, is a bifurcated catch, for the purpose of holding the pivots $c'$ at either extremity of the slots R R. Each wing is provided with a slot, $n\ n$, through which passes the bolt $e$. The bolt is provided with two ferrules, $e^1$, Fig. 3, which are interposed between the braces $h\ h$ and the standards. Each of these ferrules are made a trifle longer than the thickness of one of the wings of the catch, so that the bolt $e$ can be made to do a double purpose—that is, to set up sufficiently hard to prevent the spread of the standards, and also act as a pivot upon which the catch can move freely. Each wing of the catch is cut in upon its front edge, so as to form two hooks, $n^1\ n^i$, at such a distance from the top of the slots $n\ n$ as to permit their hooking under the pivot $c'$ (which extends sufficiently for the purpose) when raised to the tops of the slots R R. The wings of the catch extend down to about opposite the bottom of the slots R R, and the lower rear portions are cut away sufficiently to allow the pivot $c'$ to rest behind the wings in the lower back extremity of the slots R R, the wings (and, therefore, by the wings, the pivot $c'$) being held from going farther forward than this last-described location by the transverse uniting portions $n^2\ n^2$, Fig. 5, coming in contact with the rear edges of the standards E and F. The slots $n\ n$ permit the catch to be raised sufficiently to bring the lower end of the wings frontwise over the pivot $c'$ when at the lower rear extremity of the slots R R. The object of this arrangement is to enlarge the scope of the tool for thick or thin metal. When the bar to be cut is thick, the blades are thrown wide apart by working with the pivot $c'$ at the upper extremities of the slots R R, hooking the catch under the pivot, as described. To finish the cut, or to cut thin metal, the pivot $c'$ is worked at the bottom of the slots and held there by the catch, as described.

It is obvious that by the use of the stepped slots in the frame of the tool, together with proper mechanism, I can make a very powerful punch for metal, and I intend so to do; also, that the capacity and power of my shear can be increased by more steps in the slots, and that many modified devices can accompany these stepped slots in the frame for producing the results described; and I do not wish to confine myself to the exact devices described.

Having thus fully described my invention, what I claim as new, and for which I desire to secure Letters Patent, is—

1. The combination, with the lever C, with pivot $c'$ and straps P P, or equivalent mechanism, and two shearing-blades, of the standards E F, provided with the stepped slots R R, substantially as and for the purpose set forth.

2. The combination, with two shearing-blades, straps P P, lever C, with pivot $c'$, and standards E F, provided with stepped slots, as described, of the catch N, substantially as and for the purposes set forth.

3. The combination of the blades A B, standards E F G H, guard L, lever C, straps P P, catch N, and braces $h\ h$, all arranged and operating substantially as and for the purposes set forth.

In testimony that I claim the foregoing as my own I affix my signature in the presence of two witnesses.

WILLIAM G. COLLINS.

In presence of—
B. B. COLLINS,
S. E. BROWN.